United States Patent
Timmins

(10) Patent No.: US 9,108,129 B2
(45) Date of Patent: Aug. 18, 2015

(54) FILTERING MACHINE

(76) Inventor: John Andrew Timmins, Wolverhampton (GB)

(*) Notice: Subject to any disclaimer, the term of this patent is extended or adjusted under 35 U.S.C. 154(b) by 394 days.

(21) Appl. No.: 13/510,861

(22) PCT Filed: Jun. 3, 2010

(86) PCT No.: PCT/GB2010/050935
§ 371 (c)(1),
(2), (4) Date: May 18, 2012

(87) PCT Pub. No.: WO2011/064561
PCT Pub. Date: Jun. 3, 2011

(65) Prior Publication Data
US 2012/0267311 A1     Oct. 25, 2012

(30) Foreign Application Priority Data

Nov. 30, 2009  (GB) .................................. 0920902.4
Apr. 1, 2010   (GB) .................................. 1005535.8

(51) Int. Cl.
| B01D 39/06 | (2006.01) |
| B05D 7/00  | (2006.01) |
| B01D 24/02 | (2006.01) |
(Continued)

(52) U.S. Cl.
CPC .............. *B01D 39/06* (2013.01); *B01D 46/003* (2013.01); *B01D 46/0035* (2013.01); *B01D 46/30* (2013.01); *B01D 24/22* (2013.01); *B01D 27/005* (2013.01); *B01D 27/02* (2013.01); *B01D 27/08* (2013.01); *C02F 1/281* (2013.01); *C02F 1/283* (2013.01); *C02F 1/288* (2013.01);
(Continued)

(58) Field of Classification Search
CPC ........ B01D 15/00; B01D 27/02; B01D 27/08; B01D 23/10; B01D 24/22; B01D 27/005; B01D 39/06; B01D 46/30; B01D 46/0035; B01D 46/003; C02F 1/281; C02F 1/283; C02F 1/288; C02F 1/40; C02F 2101/325; C02F 2201/006
USPC .............. 210/259, 265, 282, 289, 496, 502.1, 210/505, 509, 691, 694
See application file for complete search history.

(56) References Cited

U.S. PATENT DOCUMENTS

| 4,168,229 A | 9/1979 | Chambers |
| 4,309,289 A | 1/1982 | Head |
(Continued)

FOREIGN PATENT DOCUMENTS

| FR | 2196187 A  | 8/1972 |
| JP | 63028411 A | 2/1988 |

OTHER PUBLICATIONS

International Search Report for PCT/GB2010/050935, mailed Dec. 27, 2010.
(Continued)

*Primary Examiner* — Matthew O Savage
(74) *Attorney, Agent, or Firm* — Lathrop & Gage LLP

(57) ABSTRACT

A filtering machine (10) for filtering a condensate which includes entrained oily contaminant, the machine (10) including a filter (14) through which the condensate passes from an inlet (17), to a main filter chamber outlet (24), the filter (14) including an exterior housing (15) through which the condensate, in use, passes into a filter interior, and through which filtrate, in use, passes from the filter interior, and the filter interior including a mass of filter material which includes silica-based oleophillic fibers (29).

25 Claims, 2 Drawing Sheets

(51) Int. Cl.
*C02F 1/28* (2006.01)
*C02F 1/32* (2006.01)
B01D 46/00 (2006.01)
B01D 46/30 (2006.01)
*C02F 101/32* (2006.01)
*B01D 27/02* (2006.01)
*B01D 24/22* (2006.01)
*B01D 27/08* (2006.01)
*B01D 27/00* (2006.01)
*C02F 1/40* (2006.01)

(52) U.S. Cl.
CPC ............ *C02F 1/40* (2013.01); *C02F 2101/325* (2013.01); *C02F 2201/006* (2013.01)

(56) References Cited

U.S. PATENT DOCUMENTS

| | | | |
|---|---|---|---|
| 4,753,730 A | | 6/1988 | Maurer |
| 5,215,407 A | * | 6/1993 | Brelsford ........................ 405/63 |
| 6,780,334 B1 | * | 8/2004 | Timmins et al. .............. 210/799 |
| 2003/0047511 A1 | * | 3/2003 | Burton et al. ................. 210/660 |
| 2006/0096263 A1 | | 5/2006 | Kahlbaugh |
| 2006/0157397 A1 | | 7/2006 | Yokota |
| 2009/0050578 A1 | * | 2/2009 | Israel et al. ................... 210/767 |
| 2013/0068686 A1 | * | 3/2013 | Timmins .................... 210/500.1 |

OTHER PUBLICATIONS

Search Report for GB0920902.4, search date Apr. 19, 2010, issued by the Intellectual Property Office of the United Kingdom.

* cited by examiner

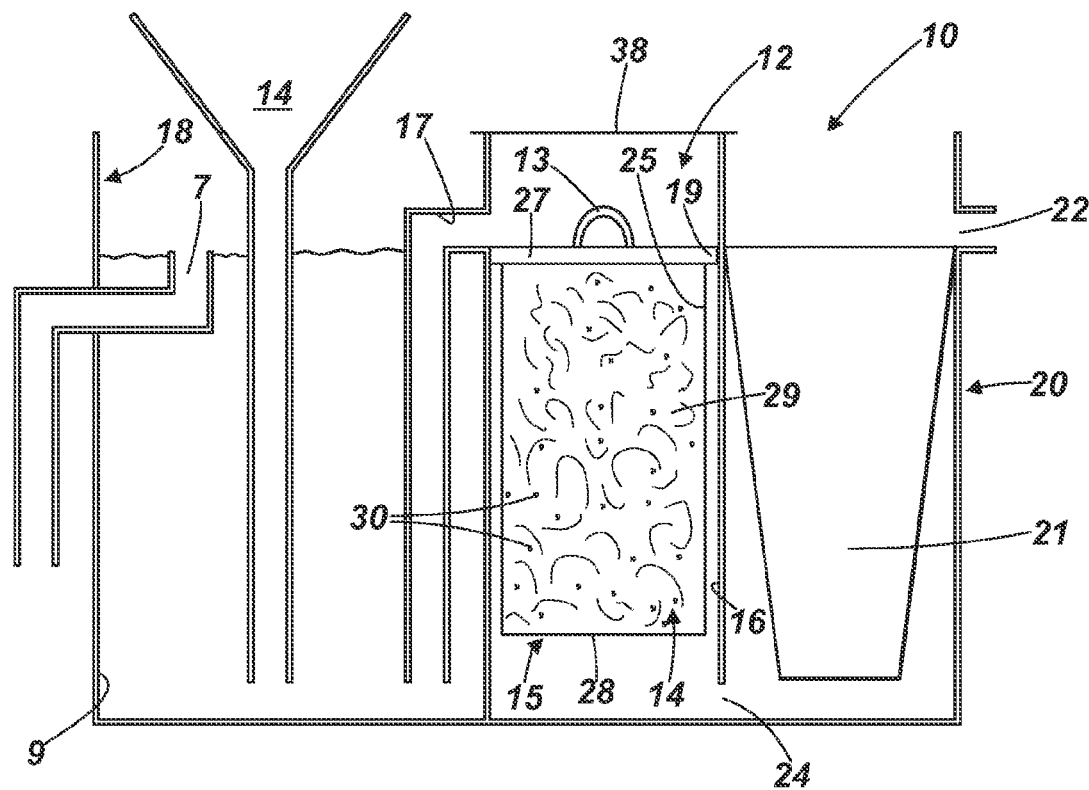
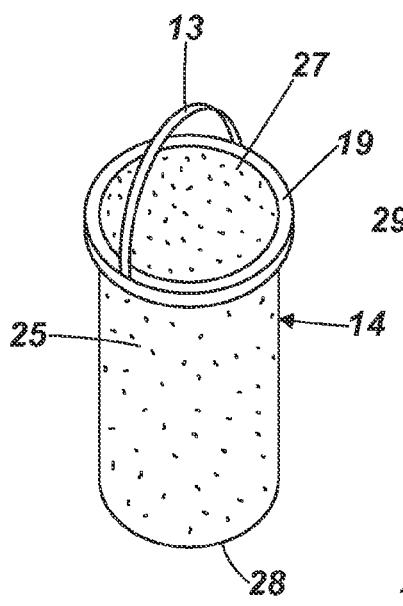
Fig. 2
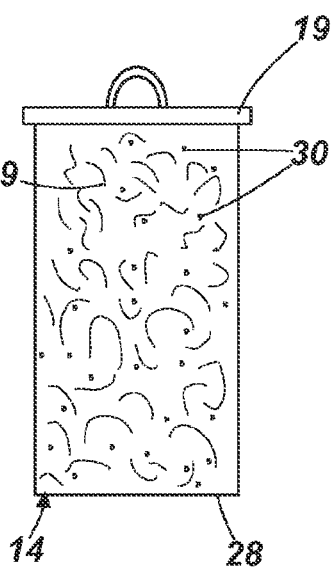
Fig. 3
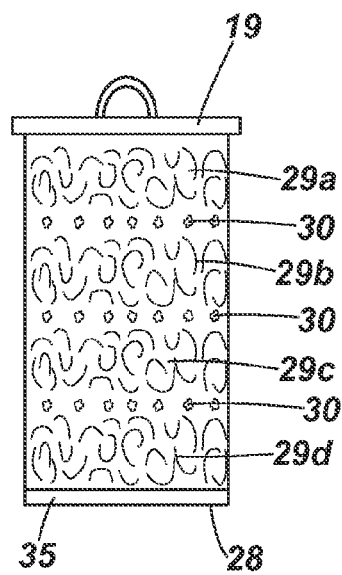
Fig. 4

FILTERING MACHINE

CROSS-REFERENCE TO RELATED APPLICATIONS

This application claims the benefit of priority from PCT/GB2010/050935, filed Jun. 3, 2010, which claimed the benefit of priority from British Patent Application Nos. GB 0920902.4, filed Nov. 30, 2009, and GB 1005535.8, filed Apr. 1, 2010, each of which is hereby incorporated by reference in its entirety.

This invention relates to a filtering machine and more particularly but not exclusively to a filtering machine for filtering condensate from an air compressor. Such condensate typically is predominantly water, with some entrained impurities, specifically oil.

It is known to remove the oil from the condensate using filter material, typically by filtering the condensate though activated Carbon material. This is very efficient at removing the oil, but is expensive, and this can quickly become contaminated where the condensate contains larger amounts of oil.

Another proposal, described in U.S. Pat. No. 4,753,730, uses oleophillic fibres of polypropylene as a filter material. Although the use of fine fibres such as those suggested in U.S. Pat. No. 4,753,730 maximises the available surface area for contacting the condensate to be filtered, a problem with such fine fibres is that they matt when subjected to heavy fluid flows or when immersed in the condensate to be filtered (or the filtrate). Such matted fibres reduce the liquid flow through the filter material. Accordingly such filter material cannot be densely packed into a filter housing as this aggravates the restricting of liquid flow.

In U.S. Pat. No. 4,753,730 matted fibres are cut into strands in an effort to improve liquid flow though the material.

Even after prolonged use of such filter material in this form, even if immersed in the liquid to be filtered, much of the matted fine fibres will tend to remain dry and uncontacted by the liquid as the liquid to be filtered flows though flow paths of least resistance in the matted fibres.

To improve filtering efficiency and aid fluid flow it is desirable to wet the fine fibre material. However typical wetting agents if used in conjunction with polypropylene fibres, have a deleterious effect, as detergent or another surfactant for example reduces the polypropylene's ability to discriminate between for example, oil and water, with the effect that the material adsorbs both oil and water thus reducing filtering efficiency.

According to a first aspect of the invention I provide a filtering machine for filtering condensate which includes entrained oily contaminant, the machine including a filter through which the condensate passes, the filter including an exterior housing through which the condensate, in use, passes into a filter interior, and through which filtrate, in use, passes from the filter interior, and the filter interior including a mass of filter material which includes silica-based oleophillic fibres.

It has been found that using a mass of oleophillic silica-based fibres, and more particularly but not exclusively short fine fibres, more efficient filtering of the condensate can be achieved than using a filter material of polypropylene fibres.

It has been found surprisingly that silica-based fibres, and particularly but not exclusively glass fibres, are very efficient at filtering oily contaminant from water. Such fibres can be wetted with a detergent or other surfactant for example further to improve filtering efficiency and to aid flow though the filter material, or at least passage of the filtrate, without the silica-based fibres losing their ability to discriminate between oily contaminant and water.

Accordingly more oily contaminant is adsorbed whilst more water in the condensate is permitted to flow through the material.

Because the wetted silica-based fibres are so much more efficient at filtering than e.g. polypropylene, it is possible to pack the fibres to a higher density in the exterior housing.

For example, the fibres of the filter may be packed in the exterior housing to a density of between 80 grams per liter and 200 grams per liters preferably in the order of 123-140 grams per liter.

Preferably the silica-based fibres are fine and have a diameter less than 10 µm, and more preferably less than 8 µm, and typically in the range 5.0 µm to 5.5 µm.

Preferably the silica-based fibres are short fibres, by which we mean that predominantly the fibres are less than 20 mm in length.

Although any silica-based fibres which exhibit an affinity for oil i.e. are oleophillic, may be used, it has been found that glass wool fibres made to the parameters indicated above, provide a particularly effective solution, and economically.

Because the condensate tends not to be produced in large quantities, even from large scale air compressors, the flow rate of the condensate to the filtering machine tends not to be large, and the flow rate may in any event be controlled, e.g. through the use of a weir, to a low flow rate. In such an environment, the flow of condensate to the filter does not tend to compact the silica-based fibres to an extent that liquid flow through the filter is obstructed.

If desired though, the silica-based fibres may support within their mass, an anti-packing material, such as for example only, particles of e.g. Perlite or a similar material. Whereas such anti-packing material may take no active part in filtering the condensate i.e. the Perlite does not adsorb any significant quantity of oily contaminant, if any, such material may assist further in preventing the fibres in the filter packing such as to obstruct the flow of liquid through the filter, by mechanically separating the fibres and maintaining this separation in use.

The particulate material may be entangled in the fibres e.g. prior to inserting the fibres into the exterior housing, and/or the fibres of the filter material may be arranged in layers with particulate material interposed between the layers.

The particles of the particulate material may all be able to pass through a sieve of mesh size 4 i.e. may have a maximum dimension in the order of 4.76 mm.

Preferably, the fibres support an activated oleophillic adsorbent which may be in powder form. Such activated oleophillic adsorbent may function as an anti-packing material, but preferably will also improve the filtering efficiency of the filter.

The activated oleophillic adsorbent may in one example include clay, such as Bentonite clay. In one specific example, the particulate material may include Organoclay. In another example the particulate material may include activated Carbon.

The activated oleophillic adsorbent may be provided by powder particles able to pass through a mesh size 200 and thus the powder particles may have a maximum dimension of about 74 µm.

The exterior housing of the filter may be provided at least in part, by a flexible material e.g. a woven or non-woven material, and/or at least in part in a more rigid material such as a rigid or semi-rigid material.

In one embodiment, the machine includes a main filter chamber in which the filter is located, there being an inlet to the chamber for condensate, and an outlet from the chamber for filtrate, the condensate passing, in use, through the exterior housing wall into the interior of the filter, and filtrate passing back through the exterior housing wall to the main filter chamber outlet.

In this case, openings which permit condensate/filtered liquid flow to and from the interior of the filter may be provided by the construction of the housing material, e.g. between weaves, and/or by perforating the material. Where the housing material is in the nature of a cloth, the openings may be provided by needle punching e.g. during manufacture of the cloth, or the openings may be otherwise provided.

In each case though preferably the openings which permit condensate/filtrate flow are smaller or at least not substantially larger than the particles of the particulate material, including the activated oleophillic adsorbent powder particles where provided. However the particulate material will primarily be retained by being embedded in the mass of fibres.

The exterior housing of the filter may include over at least a part of its extent, multiple layers, e.g. an outer housing layer with openings, and an inner, lining, layer e.g. of a felt-like material, with passages smaller than the openings in the outer housing layer.

The filter may include an external seal which seals with the interior wall of the main filter chamber, so that condensate which passes into the main filter chamber through the inlet is constrained to pass into the filter interior before the filtrate is able to pass to the main filter chamber outlet.

The main filter chamber may include at or towards an upper end thereof, a removable lid, which when closed with the remainder of the chamber, seals or substantially seals the main filter chamber, and when opened permits removal and replacement of the filter from the main filter chamber.

The filter machine may include a secondary filter chamber which receives filtered liquid from the main filter chamber, the secondary filter chamber including a further filter such as a Carbon filter.

Where the exterior housing is provided by a rigid or semi-rigid material without openings, the machine need not have a filter chamber for the filter. The filter may include at or towards one end, an inlet for condensate, and at or towards an opposite end, an outlet for filtrate.

According to a second aspect of the invention, we provide a filter for a filtering machine of the first aspect of the invention.

According to a third aspect of the invention we provide a method of filtering using a filtering machine of the first aspect of the invention, the method including passing condensate into the filter interior, and contacting the condensate with the mass of filter material in the interior of the filter, passing the filtrate back out of the filter.

The method may include treating the silica-based fibres with a wetting agent prior to filtering.

According to a fourth aspect of the invention we provide a method of making a filter for filtering a condensate which includes entrained oily contaminant, the filter including an exterior housing through which the condensate, in use, passes to contact filter material within the interior of the filter housing, and through which filtrate passes out of the filter, and the filter further including in the interior, a mass of filter material, the method including providing the mass of filter material by taking silica-based oleophillic fibres and embedding in the fibres, particulate material, and placing in the filter interior, the mass of filter material.

The particulate material may include an activated oleophillic adsorbent.

Embodiments of the invention will now be described with reference to the accompanying drawings in which:—

FIG. 1 is an illustrative view of a filtering machine in accordance with the invention;

FIG. 2 is a perspective illustrative view of the filter of the machine of FIG. 1;

FIG. 3 is an illustrative sectional side view of the filter of FIG. 2; and

FIG. 4 is a view similar to that of FIG. 3 but of an alternative embodiment.

Figure 5:
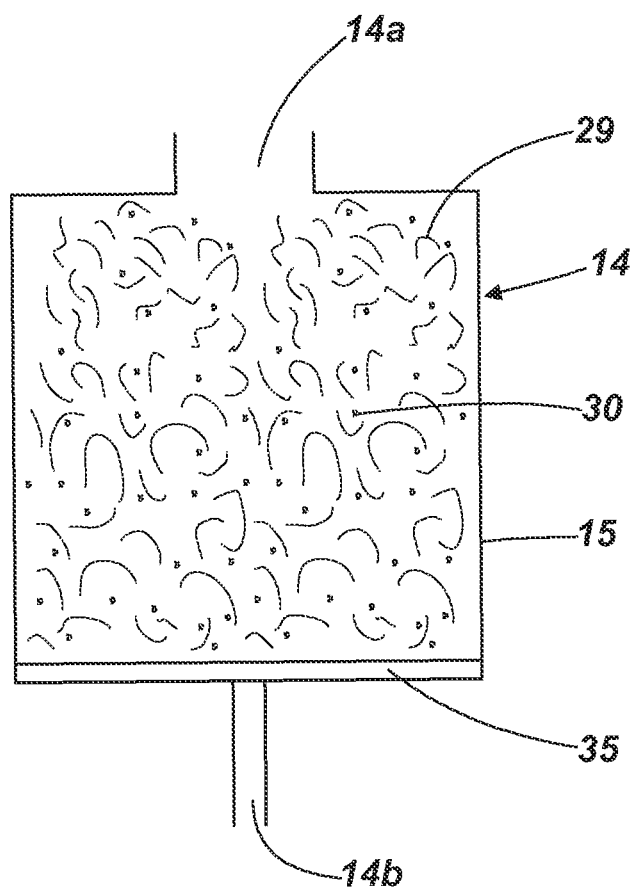
FIG. 5 is an illustrative view of a filter of another embodiment.

Referring to FIGS. 1 to 3 of the drawings, a filtering machine 10 has a main filter chamber 12 in which a filter 14 is provided. In the example the main filter chamber 12 is substantially cylindrical, and the filter 14 is of a corresponding configuration but the filter chamber 12 and/or the filter 14 could be of another configuration as required. The filter 14 includes an external housing 15, and at one axial end, i.e. the upper end of the filter 14, the filter 14 includes an external seal 19 which when the filter 14 is received in the chamber 12, provides a seal with an internal wall 16 of the main filter chamber 12.

The filtering machine 10 further includes an inlet 17 to the main filter chamber 12 through which condensate to be filtered enters the chamber 12 at a position located above the filter 14 in this example.

The inlet 17 in this example receives condensate from beneath a weir device 18. Condensate from one or more air compressors, cooling plants etc. with entrained oily contaminant is collected in an ante-chamber 9 of the weir device 18 to which it flows though a machine inlet 14. As the liquid collects in the ante-chamber 9, there will be some separation between the water component of the condensate and the oily contaminant, although some water will remain emulsified with the oily contaminant. When the liquid level in the ante-chamber 9 rises to that of an outlet weir 7, lighter floating oily contaminant (and such contaminant emulsified with water) will pass over the weir 7 and pass to a collector (not shown) for disposal.

Condensate which does not pass from the weir device 18 over the weir 7, i.e. which is the predominantly water faction, passes from a lower region of the ante-chamber 9 to the inlet 17 to the main filter chamber 12, which is at the same height as the weir 7.

Condensate which enters the main filter chamber 12 via the inlet 17 is constrained to pass through the filter 14 where it is filtered, and then to a main filter chamber outlet 24 below the filter 14 in this example. The filtrate then passes in this example into the secondary filter chamber 20, flows through a Carbon filter 21, and from the Carbon filter 21 to a machine discharge outlet 22 which in this example, is at the same level as the weir 7, but could be at a lower level.

By filtering the condensate in both of the main filter chamber 12 and the secondary filter chamber 20 if required, the filtrate which is discharged at 22 is substantially cleansed of oily contaminant, and the object is for it to be sufficiently clean that the filtrate can be discharged safely to the environment.

The exterior housing 15 of the filter 14 in the main filter chamber 12 defines internally, a filter interior. The housing 15 in this example has either a cloth, woven, non-woven or the like generally flexible cylindrical side wall 25, and substantially rigid upper and low end walls 27, 28 respectively. The upper and lower end walls 27, 28 have openings provided by perforations (or the openings may be integrally formed with the upper and/or lower end walls 27, 28 material), and the flexible side wall 25 is provided with openings by perforating by needle punching e.g. during manufacture of the cloth. In another example an alternative part/the entire exterior housing 15 may be rigid, semi-rigid or flexible, or the side wall 25 may be rigid and one or both of the end walls 27, 28 flexible. In each case the openings in the exterior housing 15 in at least the upper end wall 27, provide passages through which condensate may pass into the filter interior, and the openings in the side wall 25 and the lower end wall 28 provide passages through which filtered liquid can pass back out of the filter interior.

Of course, depending on where and how the seal 19 is provided, if at all, the condensate entering the main filter chamber 12 is separated from the filtrate, and so different openings to those identified may allow for the passage of condensate/filtrate in to and back out of the filter interior. For example, if the seal 19 was provided axially part-way along the side wall, 25, the openings in the side wall 25 above the seal would allow condensate to pass into the filter interior, and openings in the side wall 25 below the seal would permit the filtrate to pass back out of the filter interior.

Within the filter interior there is provided filter material, which according to the invention includes a mass of silica-based oleophillic fibres 29.

In the examples shown in the drawings, the silica-based oleophillic fibres 29 are short glass fibres, by which we mean that predominantly the fibres are less than 20 mm in length. The fibres 29 are fine, having a diameter in the range 5.0 µm to 5.5 µm but could be up to 8 µm or even up to 10 µm in diameter, as requested. Such fibres when massed, provide a glass wool.

The fibres of the glass wool mass 29 exhibit a particular affinity for oil, and thus as the condensate contacts, e.g. passes though, the filter material, predominantly the oily contaminant is adsorbed by the fibres 29, and the water component is allowed to pass.

Using such short silica-based fibres of this diameter, particularly efficient filtering of the condensate can be achieved as the fibres 29 collectively present a large surface area to the condensate. However, instead of glass wool, any other silica-based fibres which exhibit oleophillic properties may be massed, but silica-based fibres provided as a wool provides a particularly effective solution, and economically.

To improve filtering efficiency, the glass wool fibres may be pre-treated with a wetting agent such as a detergent or other surfactant, which it has been found improves the adsorption of the oily contaminant, whilst allowing the passage of the water component of the condensate.

Within the interior of the filter 14, the glass wool or other fibre filter material 29 may be packed in the exterior housing 15 to a density of between 80 grams per liter and 200 grams per liter and preferably in the order of 140 grams per liter. The mass of filter material provides a substantial flow volume made up of the interstitial spaces between the fibres 29 so as not substantially to obstruct liquid flow through the filter material, at least prior to adsorption of a significant quantity of the oily contaminant.

Because the condensate which flows into the main filter chamber 12 tends not to be provided as a constant and sustained fluid flow, even from large scale air compressor(s), i.e. the flow rate of the condensate to the filtering machine 10 tends not to be large, the condensate flowing through the filter 14 does not tend in use, to compact the fibres at least to an extent that liquid flow through the filter is obstructed.

However, in the example of FIGS. 1 to 3, embedded in the glass wool filter material 29, are particles 30 of a particulate material. Thus the fibres 29 support within their mass, the particulate material 30, such as for example only, particles of Perlite or a similar material, such particles 30 providing an anti-packing function.

Whereas such anti-packing material may take no active part in filtering the condensate, such material will assist in preventing the fibres in the filter packing such as to obstruct the flow of liquid through the filter 14, by separating the fibres 29 and maintaining this separation in use.

Desirably, such particulate material will all pass though a mesh of sieve size 4, and thus may have a maximum dimension in the order of 4.7 mm.

Preferably, though the particulate material 30 supported by the glass fibre mass 29 includes an activated oleophillic adsorbent e.g. in powder form. Such activated oleophillic adsorbent not only will have some fibre anti-packing function, but further improves the filtering efficiency of the filter 14.

The activated oleophillic adsorbent may in one example include clay particles, such as Bentonite clay particles. In the example shown in the drawings, the adsorbent material includes Organoclay. In another example the adsorbent material may include Carbon. The activated oleophillic adsorbent may be a mixture of any of these, or any other suitable, preferably particulate, oleophillic material.

The particles of the activated oleophillic adsorbent powder may all be able to pass through a mesh size 200 and thus may have a maximum dimension in the order of 74 µm.

If desired the particulate material 30 may be a mixture of an activated oleophillic adsorbent and a filler particulate material such as Perlite. Other material may be included which serves to separate the fibres 29, such as for examples, needle felt pieces, woven or non-woven material.

In the example of FIGS. 1 to 3 the particulate material 30 namely the Perlite or other anti-packing material, and the activated oleophillic adsorbent powder, where provided, is entangled in the fibres 29 of the filter material by being mixed in with the fibres 29 before the filter material is packed into the exterior housing 15.

In FIG. 4 a modification is illustrated in which the glass wool or other silica-based oleophillic fibre material 29 of the filter material, is arranged in discreet layers 29a, 29b, 29c, 29d in the exterior housing 15 in four layers indicated in the example, and between the layers 29a-29d is provided the particulate material 30, i.e. of Perlite or other anti-packaging material, and the activated oleophillic adsorbent powder, where provided interposed between the layers 29a-29d.

Thus the particulate material may be embedded in the fibrous mass 29 as the filter 14 is made.

However, if desired, the particles of the particulate material 30 may both be entangled in the fibres and interposed between layers of fibres.

At least in the embodiment illustrated in FIGS. 1 to 3, the openings in the side wall 15 and the upper and lower end walls 27, 28 of the exterior housing which permit condensate/filtered liquid flow are all smaller or at least not substantially larger than the particles of the anti-packaging Perlite or other particulate material, e.g. the openings may be smaller than 10 mm but preferably are smaller than 4.76 mm. This is to deter the migration of the particulate material 30 from the filter 14 though the openings. However the particulate material 30 and especially the activated oleophillic powder particles, will primarily be retained by being embedded in the fibres 29 and/or coated on the larger Perlite or similar anti-packaging particles.

In the FIG. 4 embodiment, it can be seen that at least the lower end housing wall 28 is lined with an inner lining 35 which covers the openings in the lower end wall 28. In the example the lining 35 is of a felt-like material, and so fluid flow passages in the felt material 35 will be very small at least smaller than the openings in the lower end wall 28. This lining 35 will provide a further guard to deter the particulate material 30 being washed from the filter 14 through the openings in the lower end wall 28.

In the generality, the exterior housing 15 of the filter 14, or any part of it, may include over at least a part of its extent, multiple layers, including an outer housing layer 15 with openings, and an inner or outer lining layer such as the felt-like material layer 35, with passages smaller than the openings in the outer housing layer 15.

In the FIG. 5 embodiment, the filter 14 has an exterior housing 15 of rigid or semi-rigid material which is liquid-tight. The filter 14 though has an inlet at one end, indicated at 14a for receiving condensate, and an outlet 14b at an opposite end for filtrate. The filter 14 does not need to be accommodated in a filter chamber as with the previous embodiments. The filter 14 does not require a seal 19.

Various further modifications may be made without departing from the scope of the invention.

Another filtering machine in accordance with the invention need not have a weir device 18 to collect condensate, but condensate may directly enter the main filter chamber 12 via an inlet 17 where a chamber 12 is provided, or directly into the filter via the inlet 14a as in the FIG. 5 embodiment.

In the example of the FIGS. 1 to 4 embodiments, the main filter chamber 12 includes at an upper end thereof a lid 38 which when closed as shown, seals the main filter chamber 12. When the lid 38 is removed or otherwise opened, access can be gained to the interior of the main filter chamber 12 to permit of removal and replacement of the filter 14 through the upper end of the main filter chamber 12, when the filter 14 is clogged and/or saturated with oily contaminant. To facilitate this operation, the filter 14 is provided in the example, at the upper end thereof, with a handle 13. In another example the filter 14 could be a floating filter which descends as more and more oily contaminant is adsorbed.

The glass wool material 29 is light, even when packed to the density mentioned above, and where the filter housing 15 is light, it can be the case that the filter 14 floats in the filter chamber 12, or at least floats too readily, at least when new. Accordingly, in yet another example, if required, ballast may be included in the filter 14 to ensure that the filter 14 either does not float, or at least floats when new at a desired level in the filter chamber 12.

Even though the silica-based, preferably glass wool fibre material 29 of the filter 14 described is a considerable improvement over other filter materials such as polypropylene used in the context of filtering condensate from air compressors, particularly when the filter 14 is new and is first exposed to the condensate, the filter 14 may not be as efficient at filtering as it may become in due time as the filter material 29 is wetted.

Whereas the inclusion of activated oleophillic adsorbent e.g. the Organoclay will mitigate in part against this, as the activated oleophillic adsorbent will more readily adsorb the oily contaminant from the beginning, if desired the silica-based fibres may be treated with a wetting agent, such as a detergent or other surfactant, during manufacture of the filter 14.

It has been found surprisingly that subjecting the silica-based fibres with a surfactant wetting agent does not seriously detrimentally affect the fibres' ability to discriminate between water and oily contaminant i.e. such treatment results in the more efficient adsorption of the oily contaminant by the fibres, at least until the fibres are fully wetted. The wetting agent also ensures that there is less resistance to fluid flow through the mass 29 and there will be less fibres uncontacted with the condensate.

Any wetting agent used is flushed away as the filter 14 is used, and so desirably the wetting agent used has a low environmental impact.

In another example of the FIGS. 1 to 4 embodiments, a secondary filter chamber 20 may not be provided, or at least such a secondary filter chamber with a Carbon filter 21 need not be provided, but some other means of further filtered liquid treatment may be provided for, within or externally of the filtering machine 10, to enable the filtered liquid to be cleansed to such an extent that it may be released to the environment. Where a second filter is provided this may be of the same kind as the filter 14 according to the invention.

In another example, the main filter chamber 12 need not be cylindrical but may be of another configuration. In this case the filter 14 may need to be correspondingly configured.

In another embodiment, in addition to silica-based fibres, and anti-packaging/other particulate material, the filter material may include other constituents, such as other fibres which may or may not be oleophillic, to improve filtering efficiency.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A filtering machine for filtering condensate which includes entrained oily contaminant, the machine including a filter through which the condensate passes, the filter including an exterior housing through which the condensate, in use, passes into a filter interior, and through which filtrate, in use, passes from the filter interior, and the filter interior including a mass of filter material which includes silica-based oleophillic fibres; wherein the silica-based oleophillic fibres are less than 20 mm in length; and wherein the silica-based oleophilic fibres support, within their mass, an anti-packing material; wherein the anti-packing material includes particulate material able to pass through a sieve of mesh size 4; and wherein the particulate material is entangled in the silica-based oleophilic fibres.

2. The machine according to claim 1 wherein the silica-based oleophillic fibres of the filter material are packed in the exterior housing to a density of between 80 grams per liter and 200 grams per liter.

3. The machine according to claim 1 wherein the silica-based oleophillic fibres have a diameter of less than 10 μm.

4. The machine according to claim 3 wherein the silica-based oleophillic fibres have a diameter of less than 8 μm.

5. The machine according to claim 1 wherein the silica-based oleophillic fibres have a diameter in the range of 5.0 μm to 5.5 μm.

6. The machine according to claim 1 wherein the silica-based oleophillic fibres are glass wool fibres.

7. The machine according to claim 1 wherein the silica-based oleophillic fibres of the filter material are arranged in layers with particulate material interposed between the layers.

8. The machine according to claim 1 wherein the silica-based oleophillic fibres support an activated oleophillic adsorbent.

9. The machine according to claim 8 wherein the activated oleophillic adsorbent is in powder form.

10. The machine according to claim 9 wherein the powder particles are all able to pass through a sieve of mesh size 200.

11. The machine according to claim 8 wherein the activated oleophillic adsorbent includes at least one of clay, Bentonite clay, Organoclay, and activated Carbon.

12. The machine according to claim 1 wherein the exterior housing of the filter is provided at least in part by a flexible material.

13. The machine according to claim 12 wherein the machine includes a main filter chamber in which the filter is located, there being an inlet to the main filter chamber for condensate, and an outlet from the main filter chamber for filtrate, the condensate passing, in use, through an exterior housing wall into an interior of the filter, and filtrate passing back through the exterior housing wall to the outlet from the main filter chamber.

14. The machine according to claim 13 wherein the exterior housing has openings which permit condensate/filtrate flow to and from the interior of the filter which are provided by the construction of an exterior housing material and/or by perforating the exterior housing material.

15. The machine according to claim 14 wherein the openings which permit condensate/filtrate flow are smaller or at least not substantially larger than particles of the anti-packing material.

16. The machine according to claim 13 wherein the filter includes an external seal which seals with an interior wall of the main filter chamber, so that condensate which passes into the main filter chamber through the inlet is constrained to pass into the interior before the filtrate is able to pass to the outlet from the main filter chamber.

17. The machine according to claim 13 wherein the main filter chamber include at or towards an upper end thereof, a removable lid, which when closed with the remainder of the main filter chamber, seals or substantially seals the main filter chamber, and when opened permits removal and replacement of the filter from the main filter chamber.

18. The machine according to claim 13 wherein the filtering machine includes a secondary filter chamber which receives filtrate from the main filter chamber, the secondary filter chamber including a further filter.

19. The machine according to claim 1 wherein the exterior housing of the filter includes over at least a part of its extent, multiple layers.

20. The machine according to claim 1 wherein the exterior housing of the filter is provided at least in part by a rigid or semi-rigid material.

21. The machine according to claim 20 wherein the filter includes at or towards one end, an inlet for condensate, and at or towards an opposite end, an outlet for filtrate.

22. A method of filtering using the filtering machine of claim 1, the method including passing condensate into the interior, contacting the condensate with the mass of filter material in the interior of the filter, and passing the filtrate out of the filter.

23. The method according to claim 22 which includes treating the silica-based oleophillic fibres with a wetting agent prior to filtering.

24. A method of making a filter for filtering a condensate which includes entrained oily contaminant, the filter including an exterior housing through which the condensate, in use, passes to contact filter material within an interior of a filter housing, and through which filtrate passes out of the filter, and the filter further including in the interior, a mass of filter material, the method including providing the mass of filter material by taking silica-based oleophillic fibres having a length of less than 20 mm and embedding in the fibres, particulate material, the particulate material being an anti-packing material, wherein the anti-packing material includes particles which are all able to pass through a sieve of mesh size 4, and placing in the filter interior, the mass of filter material.

25. The method according to claim 24 wherein the particulate material includes an activated oleophillic adsorbent.

\* \* \* \* \*